United States Patent [19]

Yalpani et al.

[11] Patent Number: 4,925,923
[45] Date of Patent: May 15, 1990

[54] LIGNIN HAVING CHEMICALLY BOUND SULFUR AND PHOSPHORUS GROUPS MAINLY AS THIOPHOSPHATE, USING PHOSPHORUS PENTASULFIDE

[75] Inventors: Manssur Yalpani, Kirkland; Leon Magdzinski, Montreal, both of Canada

[73] Assignee: Domtar Inc., Montreal, Canada

[21] Appl. No.: 350,051

[22] Filed: May 10, 1989

Related U.S. Application Data

[63] Continuation-in-part of Ser. No. 128,164, Dec. 3, 1987, abandoned.

[51] Int. Cl.$^5$ .............................................. C08H 5/02
[52] U.S. Cl. ...................................... 530/506; 530/501; 530/502; 530/504
[58] Field of Search ......................................... 530/506

[56] References Cited

U.S. PATENT DOCUMENTS 3,081,293 3/1963 Doughty et al. ..................... 530/506

Primary Examiner—John Kight
Assistant Examiner—Frederick Krass
Attorney, Agent, or Firm—Antoine H. Gauvin

[57] ABSTRACT

A product comprising, a water insoluble lignin material, at neutral or acid pH, having chemically bound a sulfur(S) content from at least 9.5%, and a phosphorus(P) content from 3.3 to 10%. At least 50% by weight of the S and P content is thiophosphate. In said lignin material the mole ratio S/P is at least 1.8 that of S to aromatic unit (S/Ar) is greater than 0.7, and the P/Ar ratio is from 0.3 to 0.8. The lignin material has chelating capacities for gold at pH 2 of at least 2.2 millimoles per gram of lignin material. On IR analysis the lignin material has infra-red absorption bands evidencing P=S, P—S or Ar—S, P—O—Ar, aromatic, CH$_2$—S, and P—O—C groups in the vicinity of 730-750, 640-670, 1080-1110, 1490-1510, 820-845, and 965-995 cm$^{-1}$, respectively. In the absence of interferring IR bands, the sum of the intensity of the bands in the vicinity of 640-670 cm$^{-1}$ and 730-750 cm$^{-1}$ over the intensity of the band in the vicinity of 1080-1110 cm$^{-1}$ is greater than 1. The product, substantially free from unbound sulfur, may be used in chelation, floatation processes, as flame retardant, and for agricultural uses. A method of making the above comprises heating a lignin product with at least an exact equivalent molar ratio of phosphorus pentasulfide (P$_4$S$_{10}$). The reaction product must be specially treated to recover it.

14 Claims, 9 Drawing Sheets

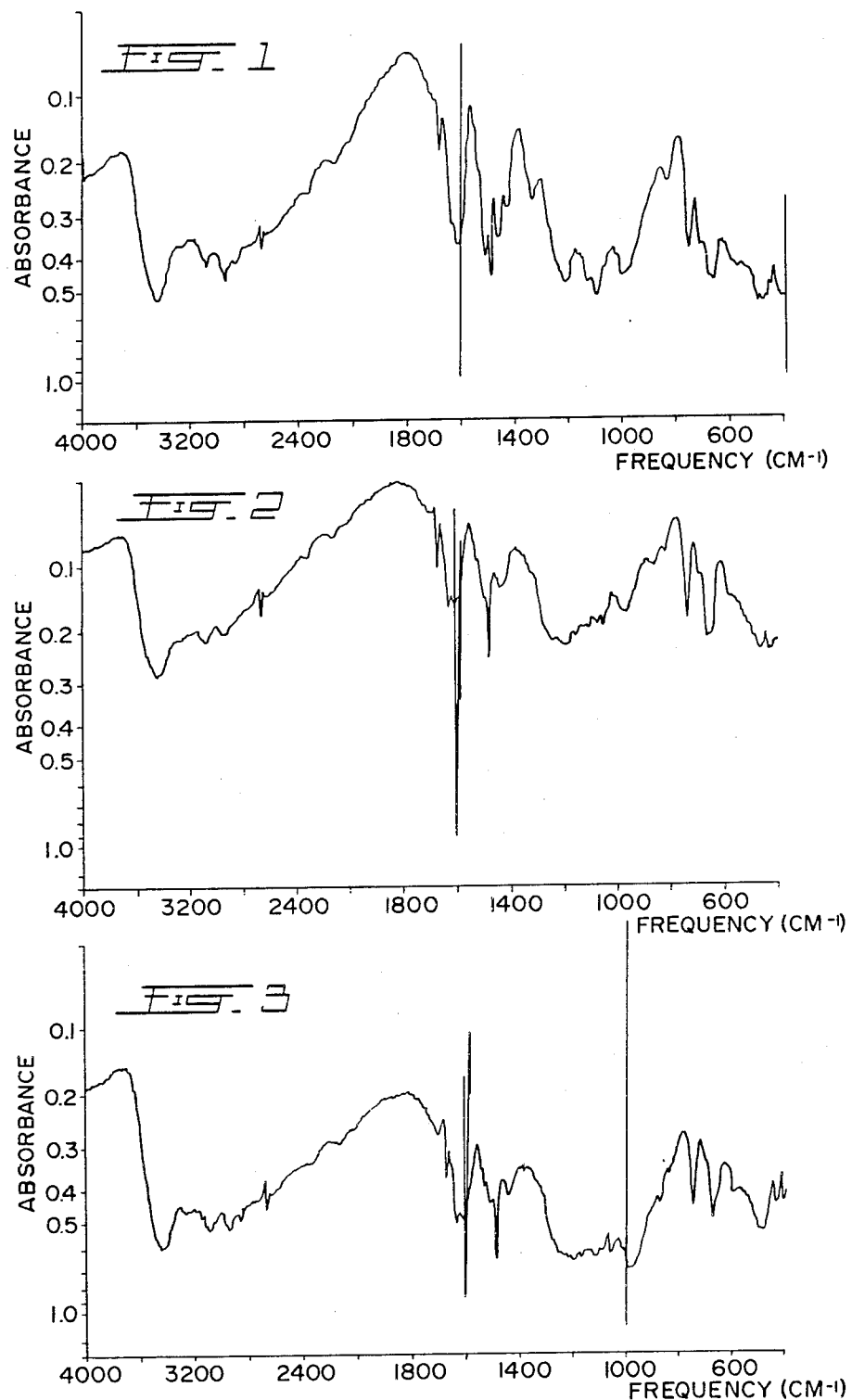

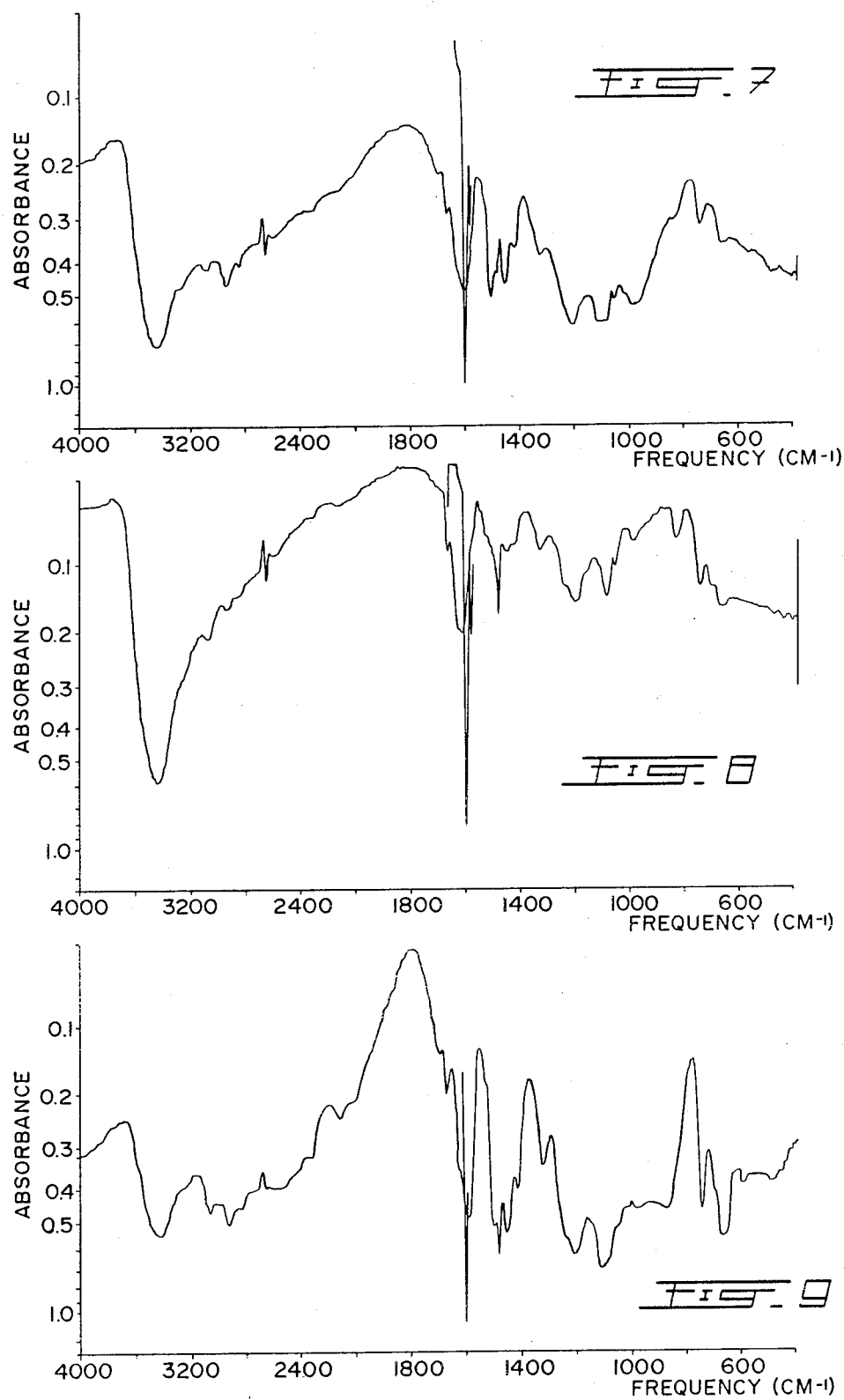

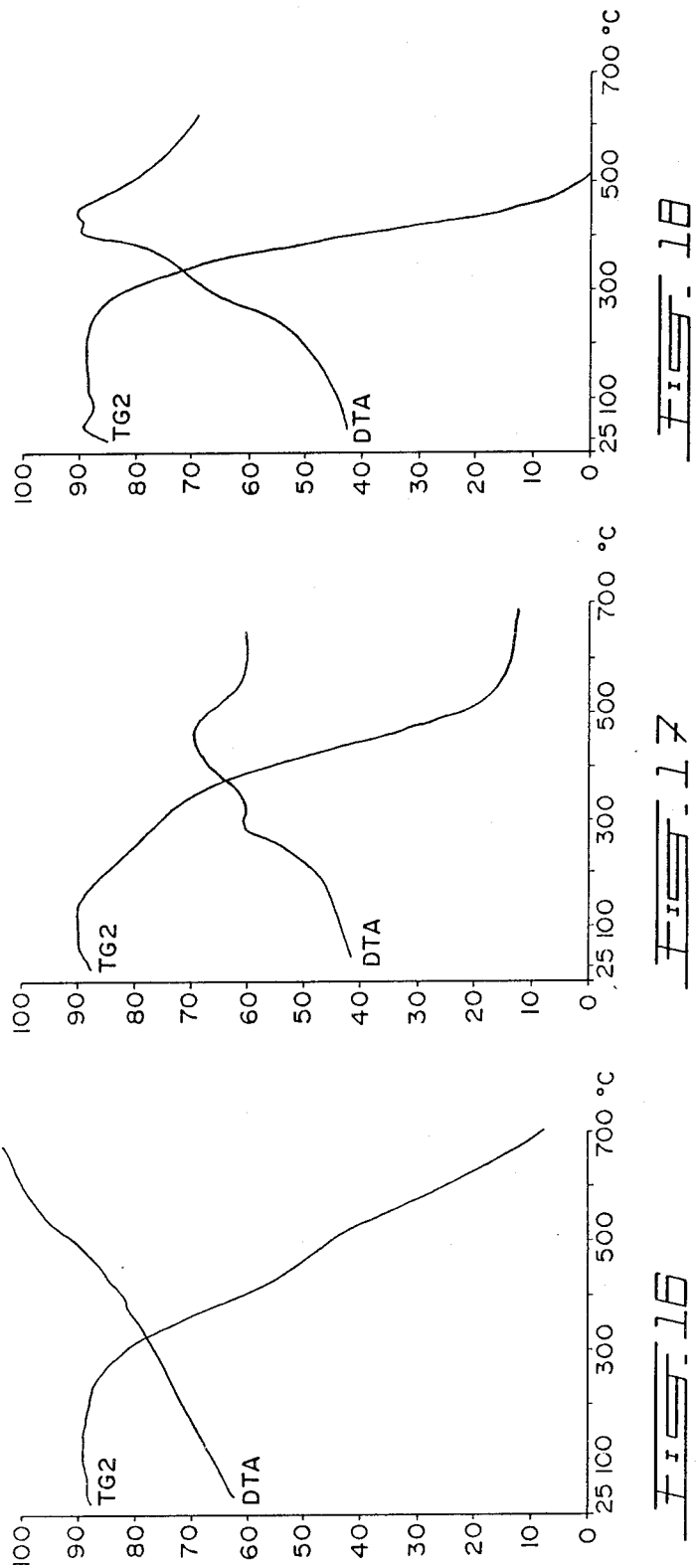

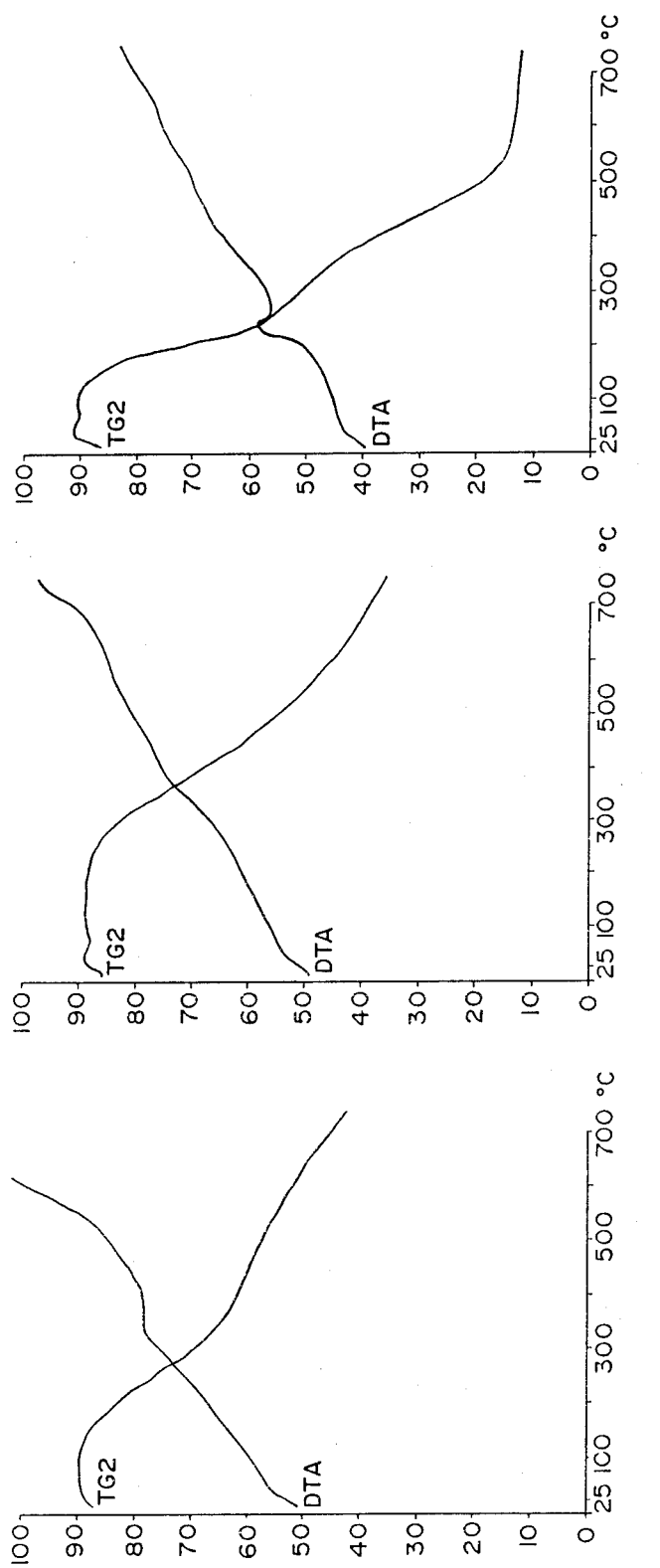

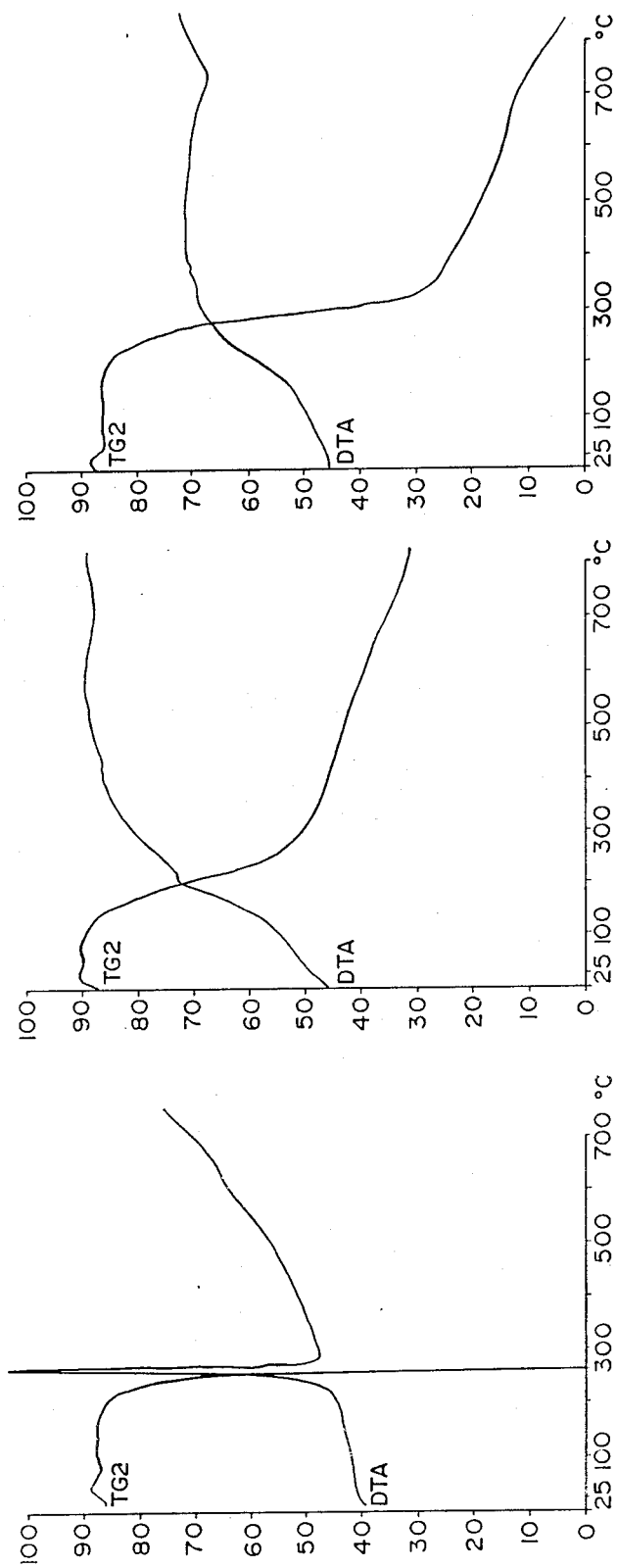

LIGNIN HAVING CHEMICALLY BOUND SULFUR AND PHOSPHORUS GROUPS MAINLY AS THIOPHOSPHATE, USING PHOSPHORUS PENTASULFIDE

This application is a continuation-in-part of application 07/128,164 filed 12/03/87 now abandoned.

FIELD OF THE INVENTION

This invention relates to a product comprising a substantially water insoluble lignin material at neutral or acid pH, having chemically bound a sulfur content from at least 9.5% and a phosphorus content from 3.3 to 10% by weight of the lignin material, at least 50% by weight of said sulfur and phosphorus being in the form of thiophosphate groups and to methods of making same. This invention is particularly directed to such lignin materials comprising the steps of reacting lignin with at least an exact equivalent molar ratio of phosphorus pentasulfide ($P_4S_{10}$) which may be followed by special treatment for recovering it. It may be used for instance in chelation, floatation processes, as flame retardants, and for agriculture uses.

PRIOR ART

Traditional ion exchange resins contain functionalities capable of exchanging their cations, as in the case of sulfonated or phosphorylated materials, or of exchanging their anions, as in quaternary aminated products. These materials are generally synthesized in granular or spherical bead form through the polymerization of ethylenically unsaturated monomers such as styrene or acrylic acid and a cross-linking agent such as divinylbenzene to render them insoluble in a particular solvent. The monomers may be modified to include desired functional groups prior to the polymerization of the preformed polymeric matrix and/or they may be subsequently chemically modified to achieve the desired acid or base form. The capacities of these materials are generally expressed in milliequivalents active protons per gram of cationic resin (meq/g) or in meq/g exchangeable chloride for the anionic resins, or sometimes referred to as: (mmol/g) as it will be used in this application.

Ion exchange resins have been used extensively in the removal of metal ions from aqueous solutions for such purposes as water softening, treatment of radioactive wastes, or the purification of industrial effluents containing heavy or toxic metals. These resins have also found application in the commercial isolation of metal ions such as uranium, in the purification and separation of the fourteen rare earths and yttrium for the fabrication of semi- and super- conductors, in the recovery of chromium from spent metal plating solutions and zinc and copper from waste occurring in the synthetic fiber industry, and in the industrial isolation of precious metals such as gold and platinum in mining and their purification in electronics.

The high cost and low selectivity of most commercial ion exchangers have prevented their technological use in the large scale purification of metals, uranium and gold being the exceptions, even though these resins are preferred for the analytical isolation of many different metals. The need for more selectivity in the industry has led to the development of ion exchange resins which are capable of binding preferentially a certain metal ion in the presence of others of the same charge. The numerous iminodiacetic acid based resins all show preference for the first row transition metals, but they are not very selective for specific metal ions. Multiple stage elution-/adsorption cycles are needed to achieve separation of several metal components. Specialty metal ion binders have been developed for metals such as copper, gold, iron, mercury, radium and uranium. Such chelators are usually manufactured from cross-linked polystyrene or cross-linked acrylate polymer backbones, which have been elaborated to contain specific metal ion binding sites. As these sites strongly bind the particular metal ion, elution of such metals from these resins usually require drastic conditions to the point of complete washing of the polymer.

Increasing precious metal prices make the leaching of low grade ores profitable only, if such metals can then be selectively isolated from the pregnant solutions containing a variety of other components usually in much greater amounts. The mining industry prefers the use of expensive and fragile coconut shell charcoal ion exchangers for their gold and silver selectivity though it has very low capacity compared with that of synthetic resins. However, most resins do not discriminate enough between different metal ions and, those which do, are not easily freed of their gold.

On the other hand, U.S. Pat. No. 3,081,293 as patented Mar. 12, 1963 and invented by Doughty, discloses as flame retardants, the reaction products of lignin with phosphorus containing compounds. Amongst the phosphorus containing compounds are phosphorus oxychloride, phosphorus pentoxide, urea phosphate, phosphorus thiochloride, phosphorus pentasulfide and urea phosphate. It should be noted that in all his examples the patentee uses excess amounts of the phosphorus containing compound and that there is no quenching of the reaction. Furthermore, the mixtures of phosphorus containing compounds and the reaction products with lignin are generally left standing at room temperatures for several hours (Example 2), to three days (Examples 1, 5-14), particularly when dealing with phosphorus pentasulfides (Example 14). Doughty aims at producing flame retardants and as is well know what counts in this respect is the phosphorus, (phosphorus being a well established flame retardant ingredient).

THE INVENTION

Broadly stated, the invention is directed to a product comprising substantially water insoluble lignin material at neutral or acid pH having chemically bound a sulfur content of at least 9.5% and a phosphorus content from 3.3 to 10% by weight of the lignin material, at least 50% by weight of said sulfur and phosphorus being in the form of thiophosphate, and wherein in said lignin material the mole ratios sulfur to phosphorus S/P is at least 1.8, sulfur to aromatic unit, S/Ar is at least 0.7 and phosphorus to aromatic unit P/Ar is from 0.3 to 0.8, wherein said Ar in said mole ratios is arbitrary set to define an aryl propane unit having an average molecular weight of 242, said lignin material has infra-red absorption bands evidencing P=S groups in the vicinity of 730-750 $cm^{-1}$, P—S or Ar—S groups in the vicinity of 640-670 $cm^{-1}$, P—O—Ar groups in the vicinity of 1080-1110 $cm^{-1}$, aromatic groups in the vicinity of 1490-1510 $cm^{-1}$, $CH_2$—S groups in the vicinity of 820-845 $cm^{-1}$, P—O—C groups in the vicinity of 965-995 $cm^{-1}$, said product being substantially free from sulfur unbound to said lignin material, said lignin material having chelating capacities for gold, at pH 2, of at least 2.2 millimoles per gram of said lignin material, and wherein when said product is free from ether groups and other groups absorbing in the region of 1080–1110 cm$^{-1}$, the sum of the intensity of the bands in the vicinity of 640–670 cm$^{-1}$ and 730–750 cm$^{-1}$ over the intensity of the band in the vicinity of 1080–1110 cm$^{-1}$ is greater than 1, and when said product comprises ether and other groups absorbing in the region of 1080–1110 cm$^{-1}$, the sum of the intensity of the bands in the vicinity of 640–670 cm$^{-1}$ and 730–750 cm$^{-1}$ over the intensity of the band in the vicinity of 1080–1110 cm$^{-1}$ less the intensity in said region by said ether group and said other groups absorbing in the region 1080–1110 cm$^{-1}$, is greater than 1.

Preferably the mole ratio S:Ar is from 0.7 to 2 and the S content is from 11 to 27.4%. Preferably also the chelating properties for gold are 5 to 11.6 mmol/g at pH 2 and up to 12.8 mmol/g at pH 3 (see Example 4).

The invention is also directed to a method of making the above product which comprises: heating under anhydrous conditions a product containing lignin material with at least a molar equivalent ratio of phosphorus pentasulfide ($P_4S_{10}$), to lignin of said lignin material, said lignin being arbitrary set to define an aryl propane unit to obtain as a reaction product a lignin material having chemically bound a sulfur content greater than 9.5% and a phosphorus content from 3.3 to 10%, wherein the mole ratio S/P is at least 1.8, that comprises one of the following steps:

(a) once said reaction product is obtained, collecting said reaction product by quenching said reaction to a temperature from about room temperature and below to avoid a reaction, inherent to said reaction product, producing unbound sulfur, and then rapidly contacting said quenched reaction product with water having acidic pH, to precipitate out the lignin material chemically bound to sulfur and phosphorus, and to leave in said water having acidic pH, said unbound sulfur, the reactants producing said unbound sulfur and the excess amount of phosphorus pentasulfide forming an aqueous solution with said acidic water, and rapidly filtering said aqueous solution to collect the precipitate of the lignin material chemically bound to sulfur and phosphorus substantially free from said chemically unbound sulfur, (b) collecting said reaction product by quenching said reaction product to a temperature from about room temperature and below, then contacting said quenched reaction product with water having acidic pH to precipitate out the lignin material chemically bound to sulfur and phosphorus and some of the unbound sulfur, and filtering said aqueous solution to collect the precipitate of the lignin material chemically bound to sulfur and phosphorus and the precipitate of unbound sulfur, and further washing with a solvent dissolving said unbound sulfur while maintaining insoluble said lignin material chemically bound to sulfur and phosphorus, to obtain said lignin material chemically bound to sulfur and phosphorus substantially free from said unbound sulfur, (c) selecting as said product containing lignin material to be reacted with said phosphorus pentasulfide, a lignocellulose product, the amounts of $P_4S_{10}$ in said molar equivalent ratio being no greater than that required to react with the cellulose fraction of said lignocellulose, once said reaction product is obtained cooling said reaction product to obtain said lignin material chemically bound to sulfur and phosphorus substantially free from any major amount of chemically unbound sulfur, the excess if said molar ratio unreacted with the lignin having reacted with the cellulose fraction, (d) selecting as said product containing lignin material to be reacted with said phosphorus pentasulfide, a lignocellulose product, said molar equivalent ratio being greater than that required to react with the cellulose fraction of said lignocellulose and carrying out the method with one of steps (a) and (b).

When the reaction is not immediately quenched, or when the reaction product is left standing with water or excess $P_4S_{10}$, part of the valuable thiophosphate is hydrolyzed and decomposed into phosphates, thereby the reaction product losing, proportionally, its chelating capacity. As the reaction temperature increases, this hydrolysis also increases.

Ideally quenching, followed by immediate filtering in an acidic medium to obtain the reaction product is preferable. If one leaves the reaction product standing, the excess $P_2S_{10}$ also tends to produce free or unbound sulfur interfering with the purity of the reaction product.

A preferred solvent to remove the free sulfur maintaining the lignin containing S and P insoluble is $CS_2$, although other solvents dissolving sulfur such as carbon tetrachloride and toluene may be used, if desired.

By "product comprising lignin materials", as for instance in "product comprising water insoluble lignin material", is meant a product which is 100% lignin or which contains as substrate a lignin, or if desired, other additives and lignin, or chemically modified lignin such as those having other compatible functional groups, i.e. not susceptible to react with $P_4S_{10}$, nor interfering with the aims of this invention: that is, partaking in the reaction to produce the functional groups that are desired e.g. P—S, P=S, C—S, O—P and not to hinder the reaction to produce them: for example, lignin sulfonate or other functional groups as lignin triazines, lignin —C=O, lignin —COOH, lignin —CH$_2$—NH$_2$. Other typical examples are products derived from hard- or softwood and including wood fibers themselves. The lignin used has generally a molecular weight greater than 500.

The lignin having no definite chemical structure, to overcome this problem, the Ar as defined above in said mole ratios, is arbitrary set to define an aryl propane unit having an average molecular weight 242. This expression is well used by those skilled in the art of lignin. Ar can be defined as a benzene ring having attached thereto a phenyl group as is discussed in Sarkanen and Ludwig: Lignins,

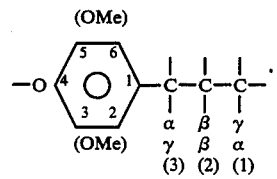

published by John Wiley & Sons Inc. 1971, page 12.

The product is cross-linkable if one desires, with cross-linking agent such as formaldehyde and may be cross-linked with other cross-linking agents that are compatible with the functional groups of the product, such as di-halogenated reagents, bis-epoxides and other known compatible cross-linking agents.

BRIEF DESCRIPTION OF THE DRAWINGS

In the drawings which illustrates particular embodiments of the invention.

FIGS. 1 to 12 represent IR spectra of the products obtained from Example 1 to 12 respectively, wherein the abscissa represents the frequency from 400 to 4000 $cm^{-1}$ as expressed in the Figures and the ordinate represents relative absorbance.

FIGS. 13 to 24 represent the isotherm obtained from Examples 1, 2 and 4 respectively wherein:

FIG. 13 is the isotherm from Example 1 in O.
FIG. 14 is same as in FIG. 13 with untreated lignin.
FIG. 15 is the isotherm from Example 1 in N.
FIG. 16 is same as in FIG. 15 with untreated lignin.
FIG. 17 is the isotherm from Example 2 in O.
FIG. 18 is same as in FIG. 17 with untreated lignin.
FIG. 19 is the isotherm from Example 2 with N.
FIG. 20 is the same as in FIG. 19 with untreated lignin.
FIG. 21 is the isotherm from Example 4 in O.
FIG. 22 is same as in FIG. 21 with untreated lignin.
FIG. 23 is the isotherm from Example 4 in N.
FIG. 24 is the same as in FIG. 23 with untreated lignin, and wherein the abscissa represents the temperature in centigrade and the ordinate for the curves TGA (thermo gravimetic analysis) represents % weight loss of the sample being analyzed versus temperature T, and the curves related to differential thermal analysis (DTA) or dT/T indicative of the heat content or enthalpy of the product being analyzed by the relation dT, wherein dT is the difference in temperature against a standard versus a given temperature T in oxygen (O) or nitrogen (N).

THE PREFERRED WAYS OF CARRYING OUT THE INVENTION

Figure 4:
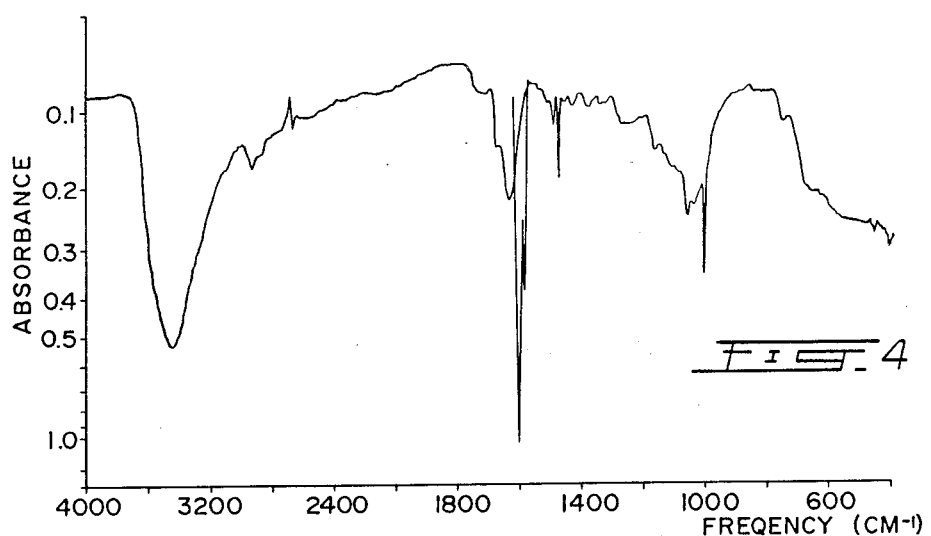

One of the preferred ways of carrying out the invention consists in dissolving lignin in a suitable anhydrous solvent and then adding phosphorus pentasulfide avoiding an exothermic reaction, and then refluxing the reaction mixture. Preferably the molar ratios of lignin to $P_4S_{10}$ range from 1:1 to 1:10 and most preferably from 1:1 to 1:2.

It should be borne in mind that when a large excess of $P_4S_{10}$ is used, the purification is more lengthy and to that extent there is a tendency for the product to decompose as illustrated in Example 15.

Amongst preferred anhydrous solvents are dioxane and pyridine. Other anhydrous solvents dissolving lignin and compatible with the reactants, may also be used, if desired: for instance, dimethylsulfoxide, dimethylformamide and tetrahydrofuran. Aqueous media should be avoided, as they tend to hydrolyze the $P_4S_{10}$.

The reaction time and temperature determine the amount of P—S addition but should be at least 2 hours at room temperature or above. Pressure may be used if desired. Preferably, the temperature ranges between 20° to 180° C. and most preferably in the vicinity of 110° C.

For instance, new materials with sulfur contents in the range 17.11–18.90% and phosphorus contents 5.36–9.03% are easily attainable by reacting lignin derived from hardwood with phosphorus pentasulfide in pyridine at elevated temperatures for periods of the order of 40 hours. In these circumstances the S:P:Ar is generally 1.1–1.5:0.5–9.8:1. Lower incorporations are attainable at room temperature in the order of (S:11.5±1.5%, P:3.3 and above) and S:P:Ar is 0.7–1.0:0-.3–0.5:1 or with reactions at reflux for only 2 hours (S:12.78%, P:5.57%). Softwood lignins showed 18.54–24.56% sulfur and 6.96–7.40% phosphorus uptake. In such cases the S:P:Ar is 1.4–1.8:0.5–0.8:1. Wood fiber reacted with phosphorus pentasulfide had 19.26% sulfur and 4.72% phosphorus. The reaction may also be conducted by melt mixing, for example at 140°–150° C. for a period of 4 hours to give products of the order of S:18.2% and P:9.95%. Preferably, the mole ratio S:P:Ar is between 0.7–2:0.3–0.8:1.

Normally, when a solvent is used, once the reaction is completed, the reaction product i.e. the lignin product is precipitated by making use of an acid medium. HCl, $H_2SO_4$, $H_3PO_4$ or other compatible acids may be conveniently used. The product may then be purified through ultrafiltration or treated otherwise.

The lignin may be modified before or after the reaction with $P_4S_{10}$. When a more insoluble product is desired, to be used as chelators for instance, the lignin product may be cross-linked. Conveniently formaldehyde is one of the cross-linking agents which may be used: In such cases, the P—S—H groups are generally no longer observable on IR analysis, reacting with the formaldehyde in the cross-linking process.

These products may be used in numerous manners, for example in chelation, as flame retardants, in polymer composites, in agriculture, and in the making of composites. They could also be used to release minerals in soils, and to immobilize biological molecules such as enzymes and other proteinaceous materials. Also in chelation, as they are generally lighter than water, they may be advantageously used in ore floatation processes, or to detoxify lakes from heavy metals and the like by froth floatation for instance. It should be noted that this product containing lignin material having S and P groups, absorbs metals rapidly.

EXAMPLES

The following will now serve to illustrate particular embodiments of the invention.

EXAMPLE 1

Eight parts by weight of a lignin derived from kraft hardwood isolated by $CO_2$ precipitation, were dissolved in 100 parts dry pyridine and then 15 parts $P_4S_{10}$ was carefully added to avoid the exothermic conditions. After stirring for 15 hours (h), the mixture was refluxed for 23 h. On cooling to about room temperature, the mixture was poured onto 1500 parts $H_2O$ and acidified to pH 2 with 85% $H_3PO_4$ to precipitate the lignin product. After standing for 3 h, the solid was collected by filtration, washed with water and dried: 14.20 parts of light brown lignin thiophosphate were obtained containing 19.92% sulfur, giving a yield of 178%.

Because insoluble sulfur had formed during the 3 hour period, the brown solid was continuously extracted with $CS_2$ in order to remove free (i.e. water insoluble, chemically unbound) sulfur, (about 4% by weight of the lignin thiophosphate).

The purified thiophosphate was dialyzed for 4 days at 22° C. with a molecular weight cut off (3500 MWCO) cellulose acetate membrane against 1200 parts $H_2O$, the water being changed each day, 13.46 parts of product were thus obtained having on analysis: C: 47.20%, H: 4.32%, P: 9.03%, S: 18.07% or S:P:Ar:: 1.5:0.7:1.

For each gram of lignin 0.68 grams of thiophosphate were incorporated into the lignin. The product had the following solubility: Water: insoluble in water having neutral and acid pH; pH 13: >15.8; pH 1: 0.6; acetone: 0.1 g/l.

The IR spectrum showed absorptions at 2330 weak (w) 2130 (w), 1505, 1095, 995, 740, 655 cm$^{-1}$ as shown in FIG. 1. The relative intensity of the main bands is given in Table 1, on page 18.

On chelation the product absorbed (mmol/g)

| pH | Au | Ag | Pt | Pd | Hg | Ca | Cu | Ni |
|----|-----|-----|-----|-----|-----|-----|-----|-----|
| 2 | 2.5 | 3.4 | 0.7 | 3.0 | | | | |
| 3 | 4.1 | 4.8 | | | 0.2 | 0.4 | 2.3 | 0.3 |
| 11 | 1.7 | | | | | | | |

When NaCl is added in the presence of Cu ions about 2.05 mmol/g of copper were chelated against 0.008 mmol/g of Na, thereby demonstrating that our "lignin thiophosphate" is a chelator. No differences in the amount of metal absorbed was absorbed in 24 h and 1 h tests indicating the efficiency and fast reacting binding capacity of our product. This product and similar products can thus be used for rapid and efficient environmental clean-up operations of toxic metal spills such as mercury, copper, nickel, or in mining operations involving the above, as well as gold, silver, platium, especially paladium etc. Since these products float, they can be used in techniques as froth floatation when the metal concentration is not too great, i.e. depending upon the amount of the metal. This tenfold molar excess of Na ions relative to copper ions indicates that this product is a true chelator as oppose to an ion exchange material.

The chelation of copper was compared against the chelating properties of a resin commercially available under the name "Dowex XFS 4195" at pH 3, wherein 1.9 mmol/g of Cu were collected, indicative of the relative good characteristics of applicant's chelating agent. The chelation of lead was also carried out at pH 6, the product chelating 1.8 mmol/g as compared against DIANION CR-10 (a resin having active COOH groups) at pH 2-5, chelating 1.5 mmol/g of lead.

A thermal analysis of the product revealed the following:

| NITROGEN | | OXYGEN | |
|---|---|---|---|
| temperature (°C.) | event | temperature (°C.) | event |
| Example 1 | | | |
| 580 | weak exotherm | 290 | exotherm |
| | | 480 | exotherm |
| 300 | 26% WL* | 300 | 20% WL |
| 450 | 45% WL | 450 | 41% WL |
| 700 | 50% WL | 700 | 73% WL |
| ash | 50% | ash | 27% |
| Untreated lignin** | | | |
| 520 | weak exotherm | 320 | exotherm |
| | | 400 | spontaneous combustion |
| 300 | 20% WL | 300 | 20% WL |
| 450 | 40% WL | 450 | 92% WL |
| 700 | 84% WL | 700 | 92% WL |
| ash | 16% | ash | 8% |

*WL in these thermal analyses of product stands for weight loss, as tabulated in Examples 1, 2 and 4. These results are graphically illustrated in FIGS. 13 to 16.

In the presence of oxygen, the product obtained from Example 1 at 700° C. was found to yield 27% as in comparison to 8% with the lignin derived from kraft hardwood as defined in Example 1, line 1, which we will call "untreated lignin**" for sake of brevity to designate in Examples 1, 2 and 4 the lignin originally used in these Examples, i.e. untreated with $P_4S_{10}$. Furthermore, the product obtained from Example 1 has two small exotherms at 290° C. and 480° C. in comparison with spontaneous combustion at 400° C. for untreated lignin (see FIG. 14). Even in nitrogen resistance to heat is also shown when the product of Example 1 (FIG. 15) whose ash content is 35% is compared with 18% for untreated lignin (FIG. 16).

This is indicative of the products utility for use as flame retardant and/or thermoplastic additive.

TABLE 1

INFRA-RED CORRELATION OF THIOPHOSPHATE PRODUCTS
INFRA-RED BAND (cm$^{-1}$) RELATIVE INTENSITY

| EXAMPLE NO. | RATIO S:P:Ar 32 31 242 | S/P | 1490-1510 (Ar) | 640-670 (P—S) or (Ar—S) | 730-750 (P=S) | S* | 820-845 (CH2—S) | 965-995 (P—O—C) | 1080-1110 (P—O—Ar) | CHELATION Gold pH 2 |
|---|---|---|---|---|---|---|---|---|---|---|
| 1 | 1.5:0.7:1 | 2.1 | 10 | 5.3 | 7.2 | 12.5 | 3.5 | 5.0 | 7.0 | 2.5 |
| 2 | 1.5:0.6:1 | 2.5 | 10 | 8.0 | 8.0 | 16.0 | 3.0 | 4.0 | 4.0 | 6.4 |
| 3 | 1.9:0.6:1 | 3.2 | 10 | 5.0 | 7.0 | 12.0 | 5.0 | 3.0 | 3.0 | 5.1 |
| 4 | 1.4:0.3:1 | 4.6 | 10 | 13.0 | 14.0 | 27.0 | 2.5 | 13.0 | 6.0 | 11.6 |
| 5 | 1.0:0.4:1 | 2.5 | 10 | 1.0 | 2.3 | 3.3 | 1.0 | 2.3 | 1.7 | 2.2 |
| 6 | 0.8:0.3:1 | 2.7 | 10 | 0.7 | 1.7 | 2.4 | 0.8 | 0.7 | 0.7 | 9.9 |
| 7 | 1.4:0.4:1 | 3.5 | 10 | 1.7 | 3.4 | 5.1 | 0.8 | 3.4 | 1.8 | 8.6 |
| 8 | 1.5:0.6:1 | 2.5 | 10 | 6.0 | 8.0 | 14.0 | 6.0 | 6.0 | 6.0 | 10.0 |
| 9 | 0.9:0.5:1 | 1.8 | 10 | 6.0 | 8.0 | 14.0 | 3.0 | 1.0 | 4.0 | |
| 10 | 1.4:0.8:1 | 1.8 | 10 | 7.5 | 0.3 | 7.9 | 0.8 | 7.5 | 1.5 | 6.4 |
| 11 | 1.1:0.5:1 | 2.2 | 10 | 6.3 | 8.6 | 14.9 | 0.6 | 3.7 | 4.3 | |
| 12 | 1.7:0.6:1 | 2.8 | 10 | 3.8 | 9.4 | 13.2 | 11.3 | 2.5 | 9.4 | |
| 13 | 1.8:0.5:1 | 3.6 | 10 | 2.7 | 1.3 | 4.0 | 6.7 | 4.0 | 10.0** | |
| 14 | 1.8:0.7:1 | 2.6 | 10 | 1.5 | 0.2 | 1.7 | 3.0 | 4.0 | 8.0** | |
| 15 | 1.0:0.7:1 | *1.4 | 10 | 2.0 | 2.0 | 4.0 | 0.6 | 4.4 | 1.8 | |
| 16 | 0.7:0.3:1 | 2.3 | 10 | 3.1 | 2.3 | 5.4 | 1.5 | 14.6 | 3.1 | |
| 17 | 2.0:0.5:1 | 4.0 | 10 | 1.5 | 7.5 | 5.4 | 1.5 | 3.0 | 4.0 | 9.8 |
| Sample | (P—S—H): 1900-3400 cm$^{-1}$ with weak maxima at 2100 and 2300 cm$^{-1}$. | | | | | | | | | |
| A | 0.54:0.4:1 | 1.3 | | | | | | | | |
| B | 0.49:0.3:1 | 1.6 | 10 | 6.7 | 1.5 | 8.2 | 0.1 | 2.2 | 8.9 | 1.14 |

S* = Sum of the intensity of the bands at 640-670 and 730-750 cm$^{-1}$
** = Containing dioxane (absorbing at 1080-1110 cm$^{-1}$, probably grafted)
15* = Extensive washing of the reaction product was done, due to excess molar equivalent ratio of $P_4S_{10}$

EXAMPLE 2

Sixteen parts of dry lignin, derived from kraft softwood, as obtained by ultrafiltration through a U.F. membrane having a molecular weight cut off (MWCO) of 20,000 and isolated by HCl precipitation, were refluxed with 200 parts dry pyridine for 30 minutes (min). $P_4S_{10}$ (30 parts) was added and the mixture refluxed for two days. On cooling to room temperature it was then poured onto 1500 parts 1N HCl and immediately filtered to prevent precipitation of sulfur chemically unbound to lignin. The solid was dialyzed for 3 days against dilute (2%) $H_3PO_4$ through a membrane having a MWCO of 5000, 24.15 parts of a product lighter than water were obtained giving a yield of 151%, and the following on analysis: P: 6.96% S: 18.54% or S:p:Ar: 1.5:0.6:1

The product had the following solubility: Water: insoluble in acid and neutral pH, pH 13: 8.6 g/l; pH 1: 0.6 g/l; acetone: 0.3 g/l.

The IR spectrum showed peaks at 2320 (w), 2130 (w), 1495, 1105, 970, 740 and 665 cm$^{-1}$ as shown in FIG. 2, and the relative intensity of the main bands is given in Table 1.

On chelation the product absorbed (mmol/g)

| pH | Au | Ag | Pt | Pd | Cu | Hg | La | Y | Er | Ca |
|---|---|---|---|---|---|---|---|---|---|---|
| 2 | 6.44 | 5.99 | 2.05 | 6.44 | | | 2.4 | 1.1 | 0.6 | |
| 3 | 7.46 | 5.44 | | | 2.0 | 1.4 | | | | 0.6 |
| 7 | 11.6 | | | | | | | | | |

This affinity for platinum, and calcium was compared respectively against commercially available resins known as: MONIVEX - having $R_2NC(S)SH$ as active groups, 2.0 mmol/g for platinum, 4.5 mmol/g for gold, and UNICELLEX UR-30 having iminodiacetic acid groups, 0.6 mmol/g for calcium, in acid at pH below 3. These resins had about the same amount of absorbed metals as in Example 2 for Pt, and Ca. It should be noted that there is no known resin commercially available for comparing against the chelating characteristics of rare earth of the product as obtained in Example 2. Example 2 however illustrates the ability to collect these rare earths, the affinity for palladium is also remarkable. There was no difference in the amounts of metal absorbed in 24h and 1h tests, indicating the efficiency and fast reacting capacity of this product.

A thermal analysis of the product revealed the following:

| NITROGEN | | OXYGEN | |
|---|---|---|---|
| temperature (°C.) | event | temperature (°C.) | event |
| Example 2 | | | |
| 320 | exotherm | 280 | exotherm |
| | | 450 | exotherm |
| 300 | 21% WL | 300 | 18% WL |
| 450 | 30% WL | 450 | 49% WL |
| 700 | 45% WL | 700 | 78% WL |
| ash | 55% | ash | 22% |
| Untreated Lignin kraft softwood* | | | |
| 350 | exotherm | 280 | exotherm |
| | | 350 | exotherm |
| 300 | 6% WL | 300 | 12% WL |
| 450 | 30% WL | 450 | 60% WL |
| 700 | 54% WL | 700 | 90% wL |

| NITROGEN | | OXYGEN | |
|---|---|---|---|
| temperature (°C.) | event | temperature (°C.) | event |
| ash | 46% | ash | 10% |

*as per line 1, Example 2

These results are graphically illustrated in FIGS. 17 to 20 in line with FIGS. 13 to 16 discussed in Example 1.

EXAMPLE 3

Sixteen parts of a dry sodium salt of a kraft softwood lignin commercially available under the trademark: "Indulin C" were refluxed with 200 parts dry pyridine for 30 minutes. $P_4S_{10}$ (30 parts) was added and the mixture refluxed for 2 days. After cooling to room temperature, it was then poured onto 1500 parts 1N HCl and immediately filtered. The solid was dialyzed against dilute (2%) $H_3PO_4$ for 5 days through cellulose acetate MWCO 5000, yielding 22.87 parts, for a yield of 140%, the product having the following characteristics: P: 7.40%, S: 24.56% or a ratio of S:P:Ar: 1.9:0.6:1

The product had the following solubility: Water: insoluble at neutral and acid pH, pH 13: >7.4; pH 1: 1.0; acetone: 0.7 g/l.

The IR spectrum showed peaks at 2310 (w), 2120 (w), 1500, 1110, 980, 740 and 670 cm$^{-1}$ as shown in FIG. 3, and the relative intensity of the bands is given in Table 1.

On chelation the product absorbed (mmol/g)

| pH | Au | Ag | Pt | Pd | Hg |
|---|---|---|---|---|---|
| 2 | 5.10 | 10.22 | 1.78 | 3.97 | |
| 3 | 9.14 | | | | 0.8 |
| 7 | 3.4 | | | | |
| 11 | 2.0 | | | | |

The chelating properties for silver (10.2 mmol/g) are superior to the commercial resins known as IMAC-TMR (having active RSH groups), with claimed capacity of 3.9 mmol/g and SVPD-5, (having active pyridine groups), with claimed capacity of 5.0 mmol/g for silver. As can be seen from the above pH profile, gold preferably absorbs in acidic pH, and more preferably in the pH 1–3 vicinity. It should also be noted that there is degradation of this particular product in basic medium.

EXAMPLE 4

Twenty parts of dried wood fiber in 200 parts of pyridine was refluxed with 50 parts $P_4S_{10}$. After 2 days, the mixture was poured onto dilute (2%) $H_3PO_4$, As there was no evidence of sulfur formation, due to all the $P_4S_{10}$ being chemically bound, the mixture in water was stirred for 4 hours at 20° C. and filtered by suction. The solid was dialyzed against 1000 parts $H_2O$ for 3 days through cellulose acetate MWCO 3500. 17.18 Parts of product were obtained, for a yield of 86% having P:4.72%, S:19.26%. Results of the IR analysis are shown in FIG. 4 and Table 1. This product has the ability to float being lighter than water.

A thermal analysis of the product revealed the following:

| NITROGEN | | OXYGEN | |
|---|---|---|---|
| temperature (°C.) | event | temperature (°C.) | event |
| Example 4 | | | |
| 380 | exotherm | 240 | exotherm |
| 300 | 36% WL | 300 | 41% WL |
| 450 | 45% WL | 450 | 60% WL |
| 700 | 55% WL | 700 | 78% WL |
| ash | 45% | ash | 22% |
| Wood fibers* | | | |
| 280 | exotherm | 270 | spontaneous combustion |
| 300 | 36% WL | 300 | 88% WL |
| 450 | 80% WL | 450 | 88% WL |
| 700 | 91% WL | 700 | 88% wL |
| ash | 9% | ash | 12% |

*as per line 1, Example 4

These results are graphically illustrated in FIGS. 21 to 24.

DISCUSSION ON THERMAL PROPERTIES

As is easily seen from Examples 1, 2 and 4 the products obtained are thermally more stable under nitrogen and oxygen than their starting materials (untreated lignin), showing reduced weight losses at elevated temperatures. Under oxygen as seen from Examples 1, 2 and 4 the products obtained show increased stability as compared with their starting materials. Their ash contents of 22–27% under oxygen at 700° C. is indicative of flame retardency, especially the suppression of spontaneous combustion seen in wood and lignin. The treatment of the latter materials with phosphorous pentasulfide ($P_4S_{10}$) suppresses the production of volatile flammable degradation products at elevated temperatures and thereby producing flame retardant products.

On chelation the product absorbed gold and silver as shown below (expressed in mmol/g):

| pH | Au | Ag | Hg |
|---|---|---|---|
| 2 | 11.6 | | |
| 3 | 12.8 | 4.4 | 2.7 |
| 7 | 9.2 | | |

This compares well against Amborane 345 (see Example 6). It was also found that at pH 11, through a column, Na Au (CN)$_2$ was collected much more rapidly than with Amberlite IRA 400, all other conditions being equal.

As can been seen even without the use of excess $P_4S_{10}$, a good chelating agent is obtained.

It should be borne in mind that when using lignocellulose an excess $P_2S_5$ may be used, that will bind to the cellulose portion of the lignin.

EXAMPLE 5

Figure 5:
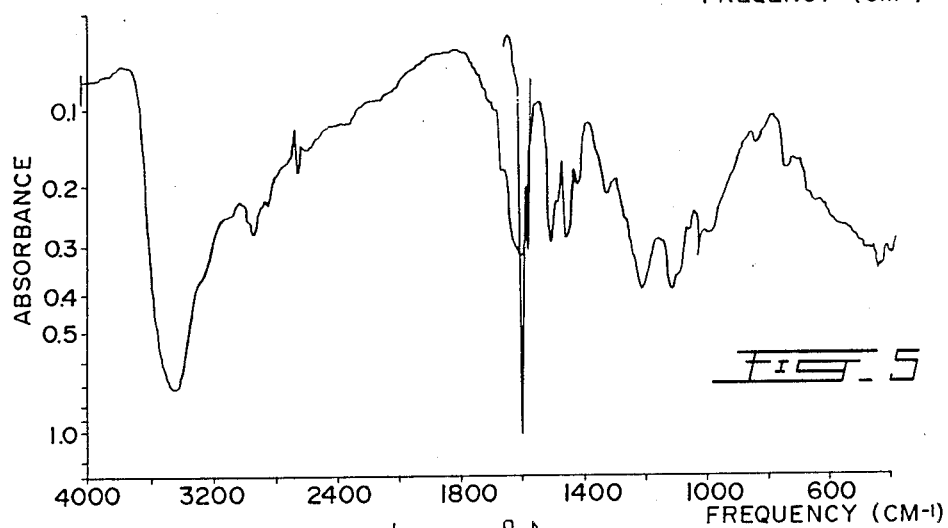

Five parts of phosphorus pentasulfide were added to a solution of lignin as obtained in Example 1 (5 parts) in 25 parts of pyridine and then refluxed. After 2 hours the mixture was cooled to about room temperature and poured onto 1500 parts of 1N $H_3PO_4$. The solid was immediately collected by suction and dialyzed 3 days against 1500 parts of dilute $H_3PO_4$ then 2 days against 1500 parts of $H_2O$ through cellulose acetate 3500 MWCO, 6.31 parts of material were obtained for a yield of 126% and having 5.57% phosphorus, and 12.78% sulfur, IR peaks at: 2300 (w), 2100 (w), 1505, 1110, 990, 740, 645 cm$^{-1}$ as shown in FIG. 5 and Table 1.

The product was able to collect 7.7 mmol/g of gold on chelation at pH of 7 in the presence of a ten-fold excess of sodium ions and 2.2 mmol/g at pH of 2.

EXAMPLE 6

Figure 6:
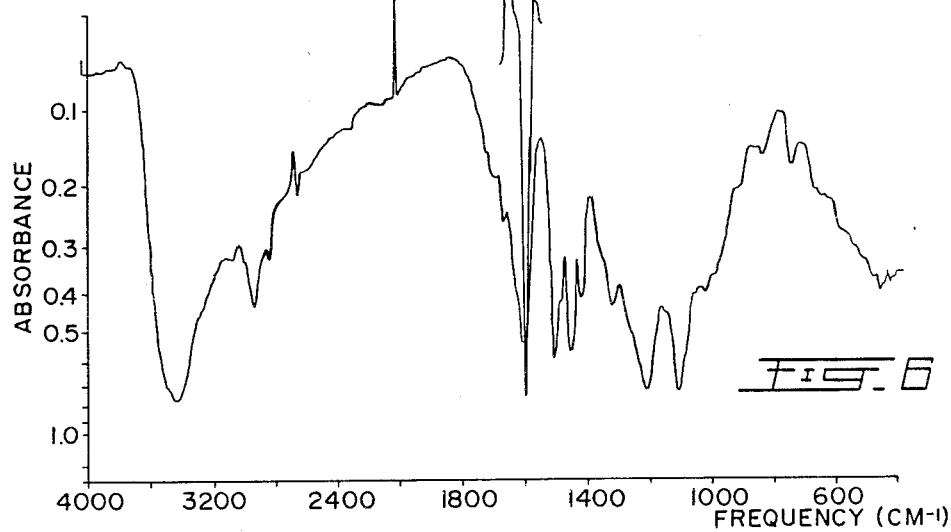

Ten parts of phosphorus pentasulfide were added to a solution containing 5 parts of a lignin as obtained in Example 1 (5 parts) in 50 parts of pyridine. After the initial exothermic reaction had subsided, the mixture was cooled to about room temperature and stirred at room temperature for 40 hours. The mixture was then poured onto 1500 parts 1N $H_3PO_4$. The solid was immediately collected by suction and dialyzed for 3 days against 1500 parts dilute $H_3PO_4$ then 2 days against 1500 parts $H_2O$ through cellulose acetate 3500 MWCO until the odour subsided, giving 5.7 parts of material, for a yield of 114%, with IR peaks at: 2300 (w), 2100 (w), 1505, 1090, 995, 835, 770, 650 cm$^{-1}$, as shown in FIG. 6, and the relative intensity of the main bands given in Table 1. On analysis, the material reveals the following: 11.53% S and 3.34% P.

On chelation it was found that this material (at a pH of 2) was able to chelate 9.9 mmol of gold per g of material, and 12.2 mmol/g at a pH 7 in the presence of a ten fold excess of sodium chloride.

Compared against commercial gold chelators one obtains the following capacity:

| Resin | pH: | Active Group: | Capacity mmol/g: |
|---|---|---|---|
| Example | | | |
| 4 | 3 | | 12.8 |
| 6 | 2 | | 9.9 |
| 6 | 7 | | 12.2 |
| Amborane 345 | 2 | $R_3N$—$BH_3$ | 8.4 (10.0*) |
| Amborane 345 | 8 | $R_3N$—$BH_3$ | 5.4 |
| Amberlite IRA-400 (coss-linked polystyrenes) | 2 | $R_3N$ | 1.8 |
| | 8 | " | 2.2 |
| IONAC SR-3 | 0–1 | $R_2NC(S)SH$ | 5.0* |
| MONIVEX | 0–2 | " | 4.5* |
| SRAFION | 0–2 | " | 4.5* |
| POLYORG XI | — | $RN=CR_2$ | 7.0* |

*(reported)

The following illustrate applicant's product superior performance for gold as compared to the best commercial products, with all other conditions being equal.

| Competitive Gold Chelation (pH = 2) in mmol/g | | | | |
|---|---|---|---|---|
| Applicant's products | | | | |
| Au/Cu | Au/Pt | Au/Ca | Au/Hg | Au/Pb |
| 4.0* 1.2 | 6.4* 2.7 | 5.7* 0.1 | 5.9 1.3 | 4.8* 0.7 |
| Amberlite IRA-400, a commercial resin | | | | |
| 3.3* 0.6 | 2.0 1.7 | 2.5 0.0 | 2.5 0.4 | 2.3 0.0 |
| Amborane 345, a commercial resin | | | | |
| 3.1* 0.6 | 5.4 4.5 | 6.4 0.0 | 7.9 0.5 | 6.2* 0.2 |

*maximum available gold chelated

| | Au | Fe |
|---|---|---|
| Applicant's product | 6.0 | 0.0 |
| Amberlite IRA-400 | 2.3 | 0.0 |
| Amborane 345 | 6.1 | 0.0 |

EXAMPLE 7

Five parts of phosphorous pentasulfide were added to a solution containing 5 parts of a lignin as defined in Example 1 in 25 parts of pyridine and refluxed at about 110° C. After 40 hours the mixture was cooled to about room temperature and poured onto 1500 parts of 1N $H_3PO_4$. The solid was immediately collected by suction and dialyzed for 3 days against 1500 parts of dilute $H_3PO_4$ then 2 days against 1500 parts water through cellulose acetate 3500 MWCO, giving 6.8 parts of material for a yield of 136%, and having 5.36% phosphorus and 17.11% sulfur with IR peaks at: 1505, 1090, 980, 740, 660 $cm^{-1}$, as shown in FIG. 7 and the relative intensity of the main bands given in Table 1.

On chelation with gold 8.6 mmol of gold were retained per gram of the material made at pH 2, and 10.0 mmol/g at pH 7 in the presence of ten times the amount of sodium chloride.

EXAMPLE 8

Ten parts of phosphorus pentasulfide were added to a solution containing 5 parts of a lignin as defined in Example 1, in 50 parts of pyridine and refluxed at about 110° C. After 40 hours the mixture was cooled to room temperature and poured onto 1500 parts of $H_2O$. The solid was collected by suction and dialyzed for 5 days against 1500 parts of $H_2O$ through cellulose acetate 3500 MWCO, to obtain 8.63 parts of product for a yield of 172%.

The material obtained had 172% the weight of the starting material, and had an IR with peaks at: 2300 (w), 2100 (w), 1495, 980, 820, 735, 645 $cm^{-1}$ as shown in FIG. 8, with the relative intensity given in Table 1. On analysis, it contained 8.02% phosphorus and 18.9% sulfur.

On chelation with gold it retained 10.0 mmol/g of the material at pH 2 and 5.2 mmol/g at pH 7 in the presence of ten times the amount of sodium chloride.

EXAMPLE 9

Five parts of phosphorus pentasulfide were added to a solution containing 5 parts of lignin as defined in Example 1 in 25 parts of pyridine and heated to 90° C. After 11 hours the mixture was cooled to room temperature and poured onto 1500 parts of 1N $H_3PO_4$. The solid was immediately collected by filtration and air dried. The dried product was washed 3 times with 100 parts carbon tetrachloride to obtain 7.25 parts of product having 6.20% phosphorus and 12.50% sulfur, for a yield of 145%. Their absorbance is illustrated in FIG. 9.

This material (at pH 6) was able to collect 2.9 mmol/g of mercury (Hg), 2.0 mmol/g lead and 2.1 mmol/g cadmium in line with commercially available substantially insoluble resins which have a claimed Hg capacity of 3 mmol/g for IMAC-TMR, or 1 mmol/g for Spheron T-1000.

EXAMPLES 10

Figure 10:
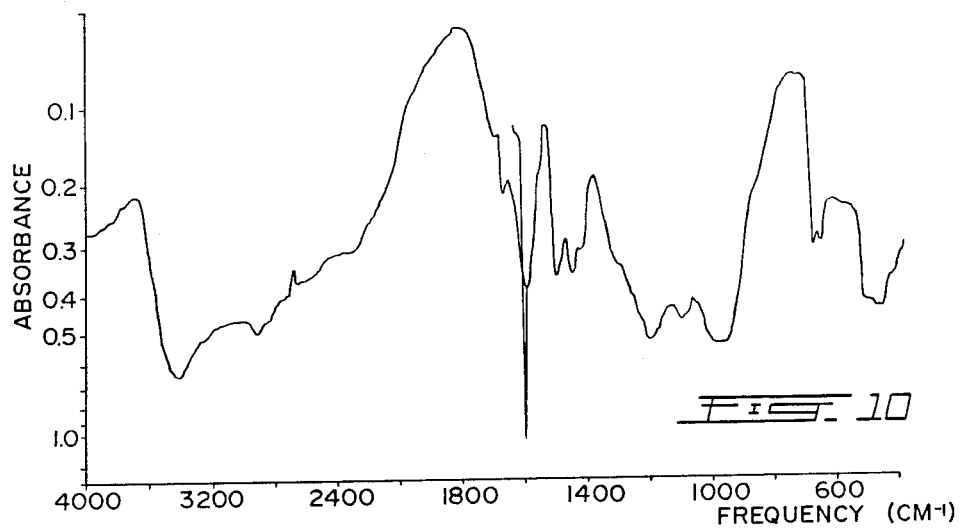

Sixteen parts of phosphorus pentasulfide and 10 parts of a lignin as defined in Example 1 were thoroughly mixed together and the mixture was heated at 140°–150° C. for 4 hours. On cooling to room temperature, 100 parts water were added and the resulting solid collected by filtration and air-dried. The solid product was washed three times with 100 parts of carbon tetrachloride to remove sulfur chemically unbound to lignin and give a material having 9.95% phosphorus and 18.2% sulfur, and P:S:Ar::0.8:1.4:1. The IR spectrum showed peaks at 2300 (w), 1500, 1100, 980, 670 and 650 $cm^{-1}$ as seen in FIG. 10. This material was able to collect 6.4 mmol/g gold at pH 2.

EXAMPLE 11

Five parts of lignin triazine material, (made by reacting 3.6 parts of a lignin described in Example 1 with 1 part of cyanuric chloride in 20 parts aqueous dioxane at pH 9), in 70 parts pyridine were reacted with 6 parts phosphorus pentasulfide at 90° C. for 21 hours. The mixture was cooled to room temperature and poured onto 500 parts water. The solid was collected by suction filtration, washed with water and dried.

Figure 11:
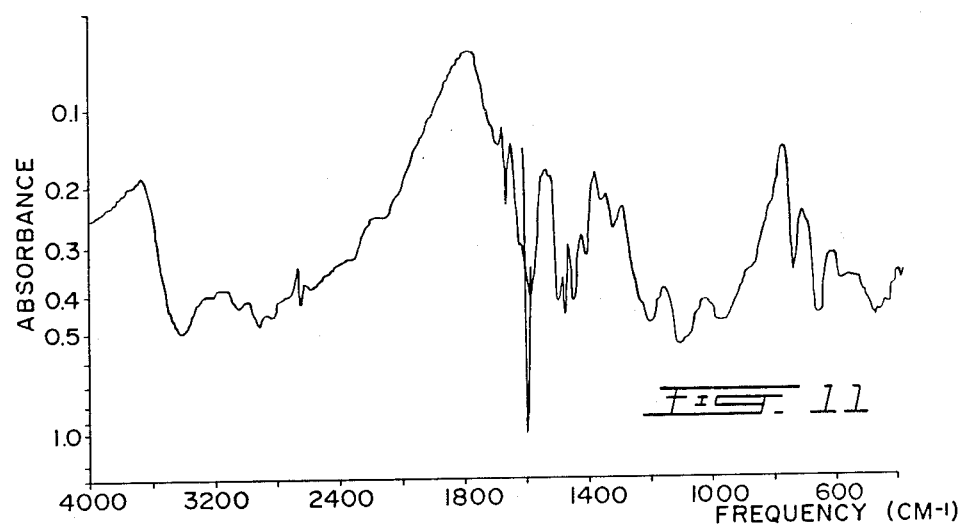

The dried solid product was washed three times with 100 parts carbon tetrachloride to give a material having 6.60% phosphorus and 15.12% sulfur P:S:Ar::0.5:1.1:1. The IR spectrum as seen from FIG. 11 showed peaks at 2300 (w), 100 (w), 1495, 1105, 970, 735 and 650 $cm^{-1}$.

EXAMPLE 12

Figure 12:
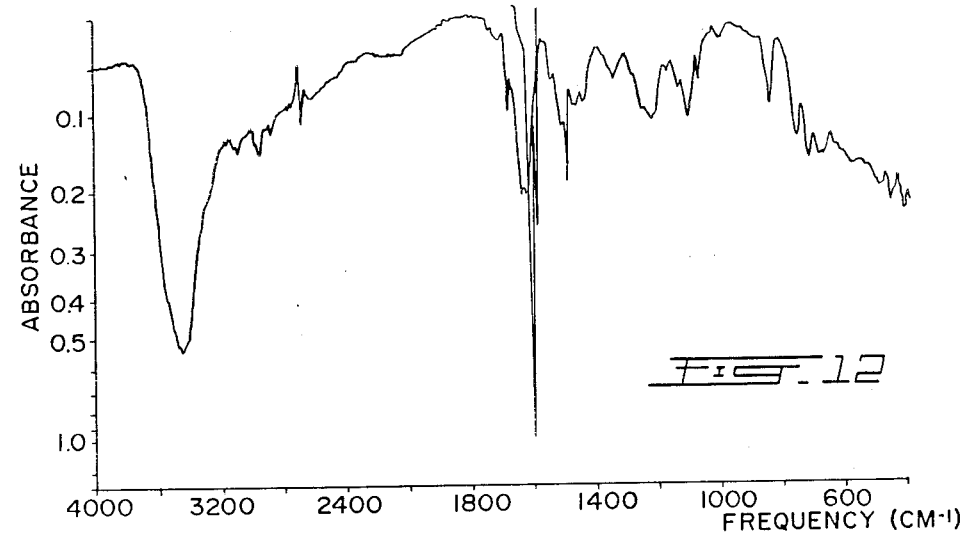
Figures 13, 14, 15:
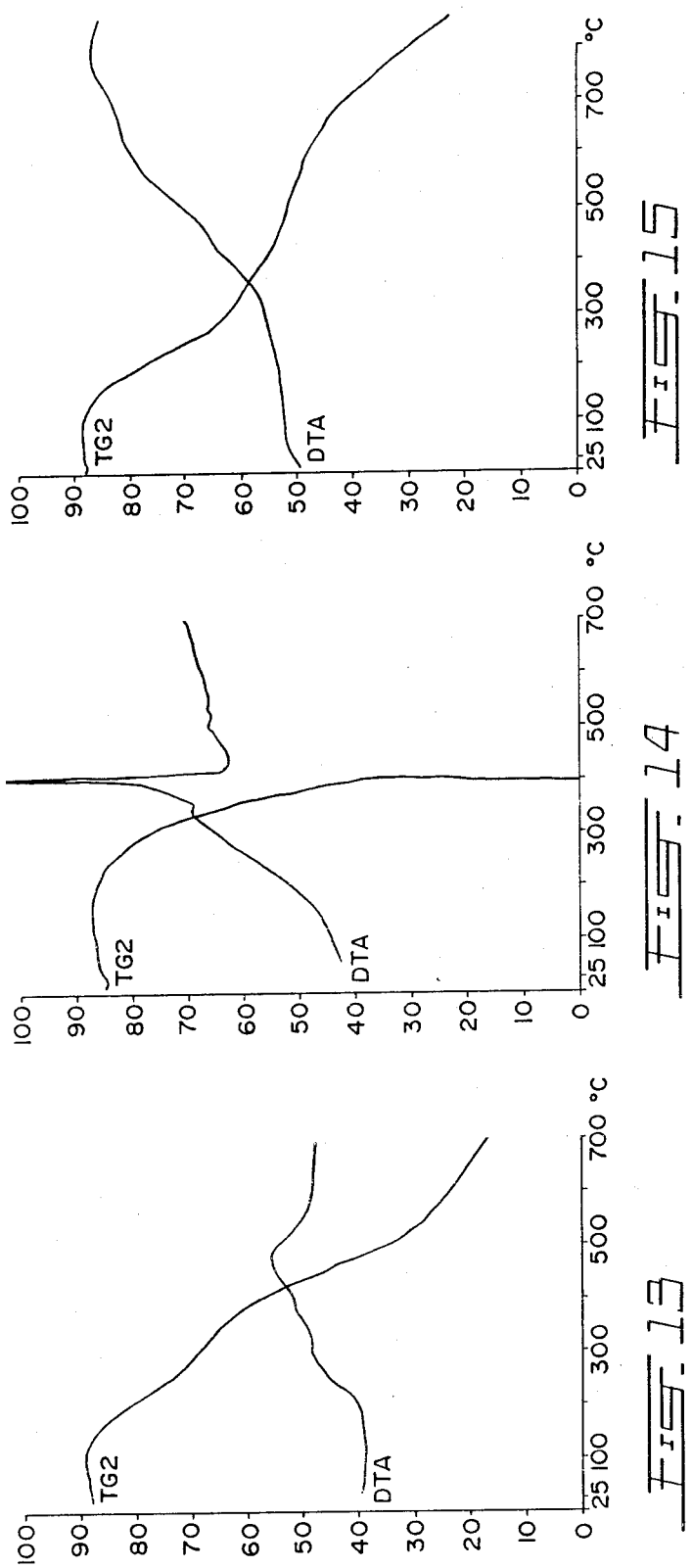

Five parts of phosphorus pentasulfide and 5 parts of a lignin as defined in Example 1, in 50 parts of pyridine were heated to 180° C. at 60 psi in a stainless steel autoclave. After 2 hours, the reaction was cooled and the resulting mixture was immediately poured onto 1N $H_3PO_4$. The solid product was filtered and dialyzed 3 days against 2% $H_3PO_4$ then 2 days against water through cellulose acetate (3500 MWCO) yielding 7.6 parts of material with 7.20% phosphorus and 22.21% sulfur and P:S:Ar::0.6:1.7:1. The IR absorbance is shown in FIG. 12.

EXAMPLE 13

Five parts of phosphorus pentasulfide were added to a solution of lignin as obtained in Example 1 (5 parts) in 50 parts dioxane containing 5 parts triethylamine to produce a basic medium. The mixture was refluxed for 40 hours and cooled to room temperature. It was then poured onto 1500 parts 1N $H_3PO_4$. The solid was immediately collected by filtration and dialyzed for 5 days against water through cellulose acetate 3500 MWCO giving 7.32 parts of product having 6.79% phosphorus and 24.29% sulfur with IR peaks at 2300 (w), 1500, 830 and 640 $cm^{-1}$. The high intensity of the band 1080–1110 $cm^{-1}$, surprisingly high, appears to be assignable to dioxane traces. Apparently, the modified lignin (as shown in Example 11) is not prone to the same phenomena. But the lignin in Example 13 behaves as in Example 14.

EXAMPLE 14

Five parts of phosphorus pentasulfide were added to a solution of 5 parts of lignin as obtained in Example 1 in 50 parts dioxane. After refluxing for 40 hours, the mixture was cooled to room temperature and poured onto 1500 parts 1N $H_3PO_4$ and the solid immediately collected by filtration. The solid was dialyzed for 5 days against water through cellulose acetate 3500 MWCO giving 7.97 parts of product having 8.72% phosphorus and 24.33% sulfur with IR peaks at 2320 (w), 1510, 1125, 1000, 655 $cm^{-1}$. The dioxane traces adding to the 1080–1110 $cm^{-1}$ band.

EXAMPLE 15

Ten parts phosphorus pentasulfide were added to 1 part of lignin as obtained in Example 1 in 50 parts pyridine and the solution refluxed for 40 hours. It was cooled to room temperature then poured onto 1500 parts 1N $H_3PO_4$ and the solid immediately collected by filtration after extensive washing to remove the large excess of $P_4S_{10}$: about 40 molar equivalent per lignin aromatic. The solid was dialyzed for 3 days against 1N $H_3PO_4$ and 2 days against water through cellulose acetate 3500 MWCO giving 1.06 parts of product having 8.80% phosphorus and 13.39% sulfur with IR peaks 2300 (w), 2100 (w), 1500, 1195, 1080, 980, 735, 640 $cm^{-1}$. The ratio P/S was only 1.4 illustrating the detrimental effect of, and the need to avoid large excess of $P_4S_{10}$ as taught in the prior art. The low P/S ratio also results in reduced chelating properties of the product, as illustrated.

EXAMPLE 16

Five parts of a lignin containing 1.75% nitrogen derived from reacting the lignin as obtained in Example 2 (20 parts) with 37% aqueous formaldehyde (100 parts) and concentrated ammonium hydroxide (200 parts) were suspended in 50 parts pyridine, 10 parts phosphorus pentasulfide were added and the mixture refluxed for 40 hours. It was then cooled to room temperature and poured onto 1500 parts 1N $H_3PO_4$ and the resulting solid collected by filtration. The solid was dialyzed for 3 days against 1N $H_3PO_4$ and 2 days against water through cellulose acetate 3500 MWCO giving 5.70 parts of product having 3.86% phosphorous and 9.52% sulfur with IR peaks at 2300 (w), 2100 (w), 1495, 1200, 1120, 985, 735, 640 $cm^{-1}$.

EXAMPLE 17

Five parts of a demethylated lignin derived from reacting the lignin as obtained in Example 1 (2 parts) with sodium periodate (2 parts) in 20 parts water containing 1 part sodium hydroxide were dissolved in 50 parts pyridine, 10 parts phosphorus pentasulfide were added and the solution refluxed for 40 hours. It was cooled to room temperature and poured onto 1500 parts 1N $H_3PO_4$ and the resulting solid isolated and purified as described in Example 16 giving 7.41 parts of product having 6.80% phosphorous and 27.39% sulfur with IR peaks at 2300 (w), 2100 (w), 1490, 1190, 1080, 990, 835, 735, 645 $cm^{-1}$.

SAMPLE A

Figure 25:
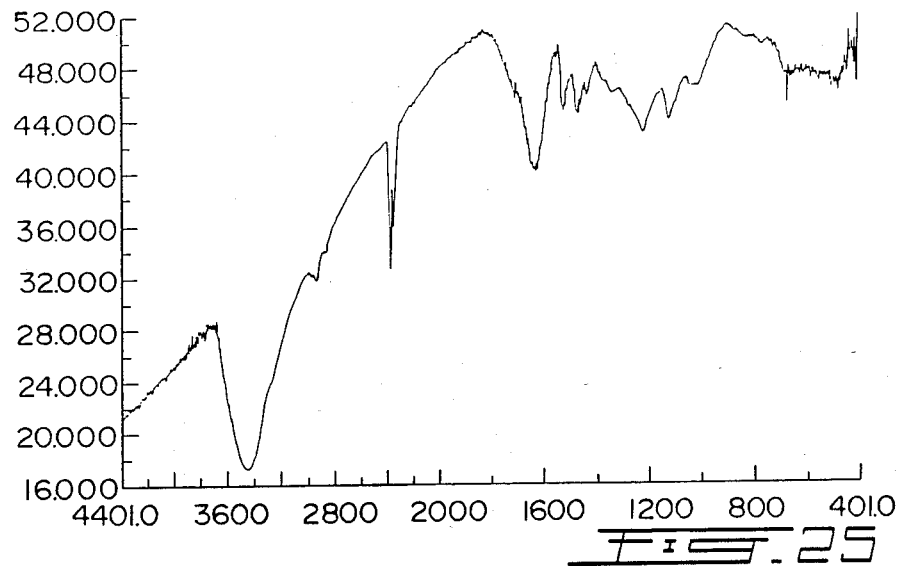
FIGS. 25 and 26 represents IR spectra of the product obtained from Sample A wherein the abscissa represents the frequency from 400 to 4400 $cm^{-1}$ (FIG. 25) and an expansion of the bands from 400 to 2000 $cm^{-1}$ (FIG. 26).
Figure 26:
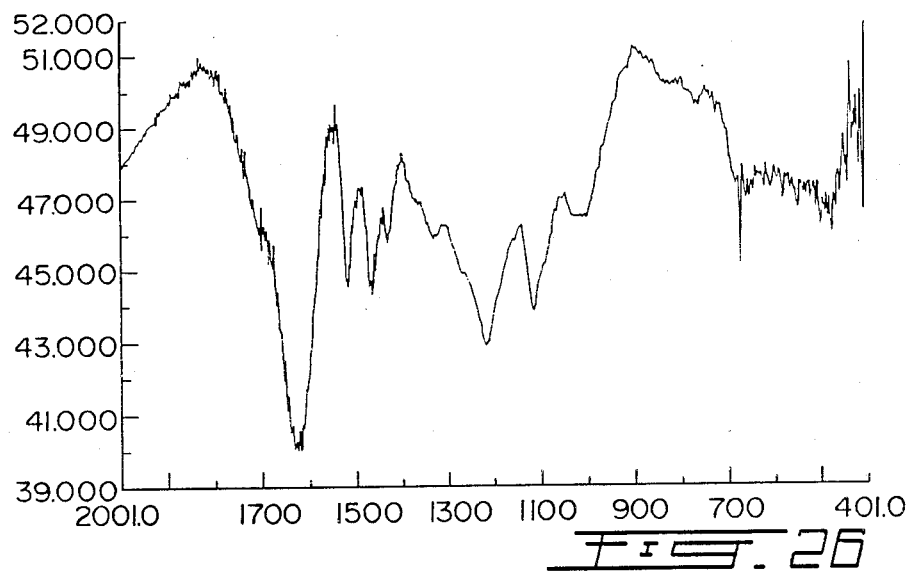

The experiment in U.S. Pat. No. 3,081,293, under Example 14 was conducted using 3 parts of kraft lignin and 1 part of $P_4S_{10}$ at 200° C. for 2 hours. The mixture was cooled to 100° C. and water was added. The product was analyzed and found to be as follows: C:52.09%; H:4.00%; N:0.64%; P:5.67%; S:7.11%. The molar ratio S:P:Ar=0.54:0.43:1. The material of Sample A was washed with water, dried and extracted with carbon disulfide to yield Sample B. On analysis to P content was reduced to 3.78% and S to 6.48%. The molar ratio S:P:Ar=was 0.49:0.29:1. The gold chelation capacity of material (Sample B) at pH 2 was determined to be 1.1 mmol/g. The IR bands are shown in FIG. 25, expanded in FIG. 26.

RATIO OF THE BANDS (640–670)+(730–750)/1080–1180.

As can be easily seen from Table 1, p.18, the sum of the intensity of the bands in the vicinity of 640–670 $cm^{-1}$ and 730–750 $cm^{-1}$ over the intensity of the band in the vicinity of 1080–1110 $cm^{-1}$ is always greater than 1, except when there is a functional group (such as ether) interfering with the band intensity 1080–1110 $cm^{-1}$. This is clearly evidence in Examples 13 and 14 where dioxane is present.

On the contrary, with the prior art as shown in Sample B, this ratio is less one.

As can be seen from Table 1, the gold chelation capacity of our product at pH 2 ranges from 2.2 to 11.6 which is two to eleven times that of Sample B which is no doubt a substantial advantage over the prior art.

Table 2 illustrates one way to confirm the molecular weight Ar which is arbitrary set to 242. From Table 1 hereinabove, in above Si is obtained for each Example from the ratio S:P:Ar, and from the respective Examples the % S.

Using the formulation $Si \times 32 \times 100 / \%\,Si$, the following is obtained from Ar.

TABLE 2

| Examples | S: Ar=Si or S=Si | % S | $Ar = \dfrac{Si \times 32 \times 100}{\%S}$ |
|---|---|---|---|
| 1 | 1.5 | 18.07 | 265 |
| 2 | 1.5 | 18.54 | 258 |
| 3 | 1.9 | 24.56 | 247 |
| 4 | 1.4 | 19.26 | 232 |
| 5 | 1.0 | 12.78 | 250 |
| 6 | 0.8 | 11.53 | 222 |
| 7 | 1.4 | 17.11 | 201 |
| 8 | 1.5 | 18.90 | 253 |
| 9 | 0.9 | 12.50 | 230 |
| 10 | 1.4 | 18.20 | 246 |
| 11 | 1.1 | 15.12 | 232 |
| 12 | 1.7 | 22.21 | 244 |
| 13 | 1.8 | 24.29 | 237 |
| 14 | 1.8 | 24.33 | 236 |
| 15 | 1.0 | 13.39 | 238 |
| 16 | 0.7 | 9.52 | 235 |
| 17 | 2.0 | 27.39 | 233 |

Sum of Examples 1 to 17 = 4119
Average $\dfrac{4119}{17} = 242$

As is clearly evidenced the average 242 is the only reasonable way to express the very complex nature of lignin in which the aromatic rings vary at infinitum: the actual weight variation as seen from the examples above being from 230 to 265.

When applicant talks about equivalent molar ratio of $P_4S_{10}$ to lignin he means:

molecular weight of $P_4S_{10}/4$ or
$(4 \times 31) + (10 \times 32)/4 = 444/4 = 111$ Average molecular weight of an aryl propane unit according to the nature of the lignin used.

For instance this molecular weight varies widely, as shown in Sarkanen and Lundwig (already referred to on page 9 hereinabove) page 672.

The average molecular weight is established between 179 to 206. For spruce 185, birch 206, kraft pine 178, kraft hardwood 183, alkali spruce 179. Applicant is aiming at rendering as explicite as possible, that which cannot.

It should also be noted that in all applicant's Examples the ratio S/P is at least 1.8, except in Example 15 wherein that example is used to illustrate the detrimental effect of a large excess of $P_4S_{10}$ that necessitates extensive washings, thereby reducing the S/P ratio and the effectiveness of the chelating properties of the reaction product of the lignin and $P_4S_{10}$.

Having described the invention, numerous modifications will be evident to those skilled in the art without departing from the spirit of the invention, as defined in the appended claims.

We claim:

1. A product comprising a lignin material substantially water insoluble, at neutral or acid pH, having a chemically bound sulfur content of at least 9.5% and a phosphorus content from 3.3 to 10% by weight of the lignin material, at least 50% by weight of said sulfur and phosphorus being in the form of thiophosphate, and wherein in said lignin material the mole ratio of sulfur to phosphorus S/P is at least 1.8, sulfur to aromatic unit, S/Ar is at least 0.7, and phosphorus to aromatic unit P/Ar is from 0.3 to 0.8, wherein said Ar in said mole ratios is arbitrary set to define an aryl propane unit having an average molecular weight of 242; said lignin material has infra-red absorption bands evidencing P=S groups in the vicinity of 730-750 $cm^{-1}$, P—S or Ar—S groups in the vicinity of 640-670 $cm^{-1}$, P—O—Ar groups in the vicinity of 1080-1110 $cm^{-1}$ aromatic groups in the vicinity of 1490-1510 $cm^{-1}$, $CH_2$—S groups in the vicinity of 820-845 $cm^{-1}$, P—O—C groups in the vicinity of 965-995 $cm^{-1}$, said product being substantially free from sulfur which is not chemically bound to said lignin material, said lignin material having chelating capacities for gold at pH 2 of at least 2.2 millimoles per gram of said lignin material, and wherein when said product is free from ether and other groups absorbing in the region of 1080-1110 $cm^{-1}$, the sum of the intensity of the bands in the vicinity of 640-670 $cm^{-1}$ and 730-750 $cm^{-1}$ over the intensity of the band in the vicinity of 1080-1110 $cm^{-1}$ is greater than 1, and when said product comprises ether and other groups absorbing in the region of 1080-1110 $cm^{-1}$, the sum of the intensity of the bands in the vicinity of 640-670 $cm^{-1}$ and 730-750 $cm^{-1}$ over the intensity of the band in the vicinity of 1080-1110 $cm^{-1}$ less the intensity in said region by said ether and said other groups absorbing in the region 1080-1110 $cm^{-1}$, is greater than 1.

2. The product as defined in claim 1 wherein said S/Ar ratio is from 0.7 to 2 and said capacity for gold is from 5.5 to 12.8 at pH from about 2 to about 3.

3. The product as defined in claim 1 having S contents from 11% to 27.39%.

4. The product as defined in claim 1 having a chelating capacity, at a pH of about 2 to 3, in millimoles per gram of lignin of:
   4.4 to 10.22 for silver
   1.78 to 2.8 for mercury
   2.3 to 3.97 for copper 5. The product as defined in claim 3 wherein said lignin material further includes an infra-red absorption band evidencing P—S—H groups in the vicinity of 2100 $cm^{-1}$.

6. The product as defined in claim 1 wherein said lignin material is derived from hardwood, the sulfur content by weight is about 11.5±1.5%, and the mole ratio sulfur:phosphorus:Ar: is 0.7–1.0:0.3–0.5:1.

7. The product as defined in claim 1 wherein said lignin material is derived from hardwood wherein the sulfur content is between 17 and 19% and the phosphorus content is between 5 and 9% and the ratio S:P:Ar: is 1.1–1.5:0.5–0.8:1.

8. The product as defined in claim 1 wherein said lignin material is derived from softwood wherein the sulfur content is between 18 and 25%, phosphorus 7–8% and the ratio S:P:Ar: is about 1.4–1.8:0.5–0.8:1.

9. The product as defined in claim 1 wherein said lignin material is derived from a lignin triazine product having an average of about one triazine fragment per Ar unit.

10. The product as defined in claim 1 wherein said lignin material is wood fibers.

11. The product as defined in claim 1 wherein said lignin material is chemically modified with at least one compatible functional group.

12. The product as defined in claim 11 wherein said modified lignin is a member selected from the group consisting of lignin—C=O, lignin—COOH and lignin—$CH_2NH_2$.

13. The product as defined in claim 1 comprising lignin and cellulose.

14. The product as defined in claim 1 having an IR spectrum substantially as shown in FIG. 4.

* * * * *